(12) United States Patent
Cymbal et al.

(10) Patent No.: US 9,249,831 B2
(45) Date of Patent: *Feb. 2, 2016

(54) BEARING ISOLATOR ASSEMBLY

(71) Applicant: Steering Solutions IP Holding Corporation, Saginaw, MI (US)

(72) Inventors: William D. Cymbal, Freeland, MI (US); Brad S. Sundholm, Bae City, MI (US); Kyle L. Collins, Saginaw, MI (US); Jason T. Rutkiewicz, Freeland, MI (US); Niklaus A. vonMatt, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/690,643

(22) Filed: Nov. 30, 2012

(65) Prior Publication Data

US 2013/0170775 A1    Jul. 4, 2013

Related U.S. Application Data

(60) Provisional application No. 61/581,886, filed on Dec. 30, 2011.

(51) Int. Cl.
 *F16J 15/00* (2006.01)
 *F16C 33/30* (2006.01)
 (Continued)

(52) U.S. Cl.
 CPC .............. *F16C 33/30* (2013.01); *F16C 19/527* (2013.01); *F16C 25/04* (2013.01); *F16C 27/06* (2013.01); *F16F 1/445* (2013.01)

(58) Field of Classification Search
 CPC ..... F16J 15/16; F16J 12/3208; F16J 15/3436; F16C 33/30; F16C 19/527; F16F 1/445

USPC .......................................................... 277/500
 See application file for complete search history.

(56) References Cited

U.S. PATENT DOCUMENTS 3,589,701 A * 6/1971 Gee ............................ 267/64.15
3,761,100 A   9/1973 Taylor et al.
(Continued)

FOREIGN PATENT DOCUMENTS

AU        504199 B2   10/1979
CN      101273224 A    9/2008
(Continued)

OTHER PUBLICATIONS

European Search Report for Application No. 12 198 332.4 dated Feb. 10, 2014; 8 pages.

(Continued)

*Primary Examiner* — Kristina Fulton
*Assistant Examiner* — Nathan Cumar
(74) *Attorney, Agent, or Firm* — Cantor Colburn LLP (57) ABSTRACT

A bearing isolator assembly comprises an inner support member, an outer support member, a resilient member, and an elastomeric ring. A path of travel is defined between the inner support member and the outer support member. The resilient member is disposed between the inner support member and the outer support member and is configured to resist compression between the inner support member and the outer support member within a first portion of the path of travel. The outer support member defines a ring envelope, in which the elastomeric ring is disposed. The inner support member defines a ring compression surface, and the elastomeric ring is configured to resist compression between the ring compression surface of the inner support member and the ring compression surface of the outer support member within a second portion of the path of travel.

18 Claims, 5 Drawing Sheets

(51) Int. Cl.
*F16C 25/04* (2006.01)
*F16C 19/52* (2006.01)
*F16C 27/06* (2006.01)
*F16F 1/44* (2006.01)

(56) References Cited

U.S. PATENT DOCUMENTS

| | | |
|---|---|---|
| 4,998,997 A | 3/1991 | Carlston |
| 5,205,384 A * | 4/1993 | Heshmat .................. 188/264 B |
| 5,221,095 A | 6/1993 | Orlowski |
| 5,290,047 A | 3/1994 | Duffee et al. |
| 5,601,031 A | 2/1997 | Carlson |
| 6,007,252 A * | 12/1999 | Thelen et al. ................. 384/535 |
| 6,155,543 A | 12/2000 | Solomond et al. |
| 6,155,544 A | 12/2000 | Solomond et al. |
| 6,364,296 B1 | 4/2002 | Cummings et al. |
| 7,163,206 B2 | 1/2007 | Cross et al. |
| 2008/0012188 A1 * | 1/2008 | Dickson ........................ 267/139 |
| 2008/0197552 A1 * | 8/2008 | Winocur ....................... 267/195 |

FOREIGN PATENT DOCUMENTS

| | | |
|---|---|---|
| DE | 102008037987 A1 | 3/2010 |
| EP | 2610509 A2 | 7/2013 |

OTHER PUBLICATIONS

Chinese Office Action for Application No. 201210582363.1 dated Jan. 6, 2015.
European Search Report for Application No. 14183586.8 dated Mar. 30, 2015.

* cited by examiner

BEARING ISOLATOR ASSEMBLY

RELATED APPLICATION

The present patent application claims the benefit of priority from U.S. provisional patent application No. 61/581,886 filed on Dec. 30, 2011.

BACKGROUND OF THE INVENTION

The present invention relates to bearing isolators and more particularly to bearing isolators including a resilient member for providing a first force characteristic within a first range of travel and including an elastomeric member providing a second force characteristic within a second range of travel.

Existing bearing isolator assemblies seek to absorb manufacturing tolerances of associated components, pre-load bearings with axial loads to eliminate looseness and unwanted bearing noise, and control worm travel and rate of deceleration. Absorption of manufacturing tolerances of worm and bearing assemblies may be accomplished while limiting travel of the components by modulating a quantity of elastomer disposed within a pair of steel cups such that the elastomer compensates for part-to-part dimensional variations. In accordance with such methods, the shape of the cups and the shape of the elastomer are such that a specific force curve is generated when the assembly is compressed. Bearing pre-load is sought to be accomplished by applying an axial force to the inner race and resisting that force on the opposite side of the bearing on the outer race. Worm travel is controlled by limiting the amount of elastomer inside the two steel cups, and retention of conventional assemblies is provided through use of adhesives.

Unfortunately, such conventional bearing isolators may be limited in their ability to provide sufficient range of travel together with desirable force characteristics. Such bearing isolators may also lack the ability to be tuned so as to provide desirable force characteristics through necessary ranges of travel along the worm axis. Accordingly, it is desirable to have a bearing isolator providing tunable force characteristics over an increased range of travel.

SUMMARY OF THE INVENTION

In an exemplary embodiment, a bearing isolator assembly comprises an inner support member, an outer support member, a resilient member, and an elastomeric ring. The outer support member is configured to cooperate with the inner support member so as to define a path of travel of the inner support member relative to the outer support member. The inner support member defines an inner spring seat directed toward the outer support member. The outer support member defines an outer spring seat directed toward the inner support member. The resilient member is disposed between the inner spring seat and the outer spring seat. The resilient member is configured to resist compression between the inner support member and the outer support member within a first portion of the path of travel. The outer support member defines a ring envelope, in which the elastomeric ring is disposed. The inner support member defines a ring compression surface directed toward the elastomeric ring, and the elastomeric ring is configured to resist compression between the ring compression surface of the inner support member and the ring compression surface of the outer support member within a second portion of the path of travel.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a bearing isolator assembly 100 includes an inner support member 102 and an outer support member 104. The inner support member 102 is disposed symmetrically about an inner support member axis 106 and defines an inner spring seat 108 and an inner bearing surface 110. The inner spring seat 108 and the inner bearing surface 110 are directed toward substantially opposite directions along the inner support member axis 106, with the inner spring seat 108 defining an internal direction 112 relative to the inner support member 102. The outer support member 104 is disposed symmetrically about an outer support member axis 114 and defines an outer spring seat 116 and an outer bearing surface 118. The outer spring seat 116 and the outer bearing surface 118 are directed toward substantially opposite directions along the outer support member axis 114, with the outer spring seat 116 defining an internal direction 120 relative to the outer support member 104.

The inner support member 102 defines inner member guide surfaces 122 and 122 that extend along the internal direction 112 in parallel with the inner support member axis 106. The outer support member 104 defines outer member guide surfaces 123 and 124 that extend along the internal direction 120 in parallel with the outer support member axis 114. When the inner support member 102 and the outer support member 104 are engaged with one another, the inner support member axis 106 is substantially aligned with the outer support member axis 114 to define a worm axis 126, with the inner spring seat 108 and the outer spring seat 116 facing substantially toward one another, and with the inner member guide surfaces 121 and 122 positioned in close proximity with the respective outer member guide surfaces 124 and 123.

In an exemplary embodiment, the inner member guide surfaces 121 and 122 and the outer member guide surfaces 123 and 124 are configured so as to constrain the relative movement of the inner support member 102 relative to the outer support member 104. In an exemplary embodiment, the outer member guide surface 124 is configured for cooperating with the inner member guide surface 122 of the inner support member 102 so as to define a path of travel 128 of the outer support member 104 relative to the inner support member 102 along the worm axis 126.

In an exemplary embodiment, a cross-sectional shape of the inner member guide surfaces 121 and 122 are circular such that the inner support member 102 may rotate about the worm axis 126 relative to the outer support member 104. In an exemplary embodiment, the inner member guide surface 122 is cylindrical such that the outer member guide surface 124 remains substantially engaged with the inner member guide surface 122 as the inner support member 102 moves along the worm axis 126 relative to the outer support member 104.

In one exemplary embodiment, the inner member guide surface 122 is directed away from the inner support member axis 106, and the outer member guide surface 124 is directed toward the outer support member axis 114. In accordance with this exemplary embodiment, the inner member guide surface 121 is disposed at a radius equal to or slightly less than that of the outer member guide surface 124. In another exemplary embodiment, the inner member guide surface 122 is directed toward the inner support member axis 106, and the outer member guide surface 124 is directed away from the outer support member axis 114. In accordance with this exemplary embodiment, the inner member guide surface 121 is disposed at a radius equal to or slightly greater than that of the outer member guide surface 124.

In an exemplary embodiment, a bearing isolator assembly 100 includes one or more retention and/or alignment features to aid in assembly, alignment, and retention of the bearing isolator assembly 100 in a functional configuration and to further define a path of travel 128 for the bearing isolator assembly 100. In an exemplary embodiment, wherein the inner member guide surface 122 is directed away from the inner support member axis 106, the inner support member 102 includes one or more, and preferably three, tabs 130 extending outwardly in a radial direction from the inner member guide surface 122 at an end of the inner member guide surface 122 distal from the inner spring seat 108.

Figure 1:
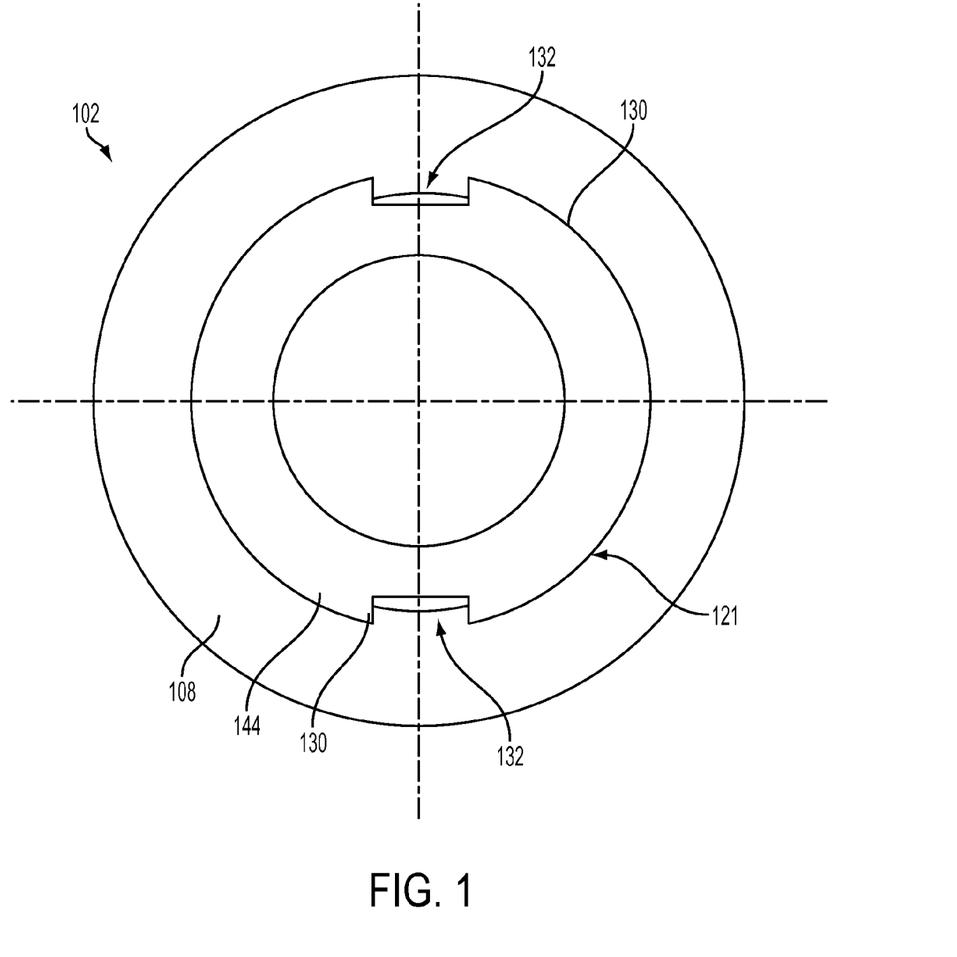
FIG. 1 is a drawing of a portion of an exemplary bearing isolator assembly in accordance with the invention.
Figure 2:
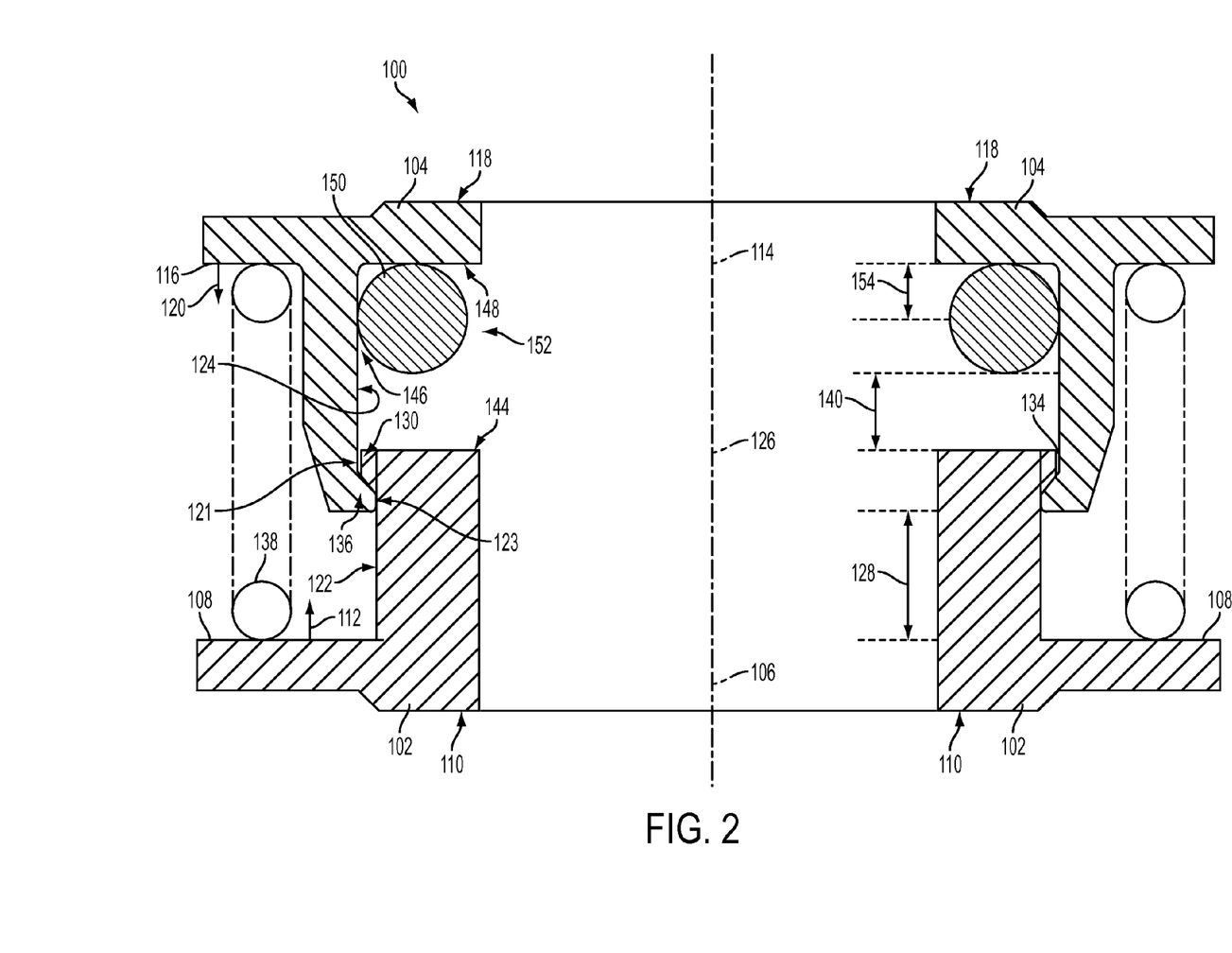
FIG. 2 is a cutaway drawing of an exemplary bearing isolator assembly in accordance with the invention.
Figure 3:
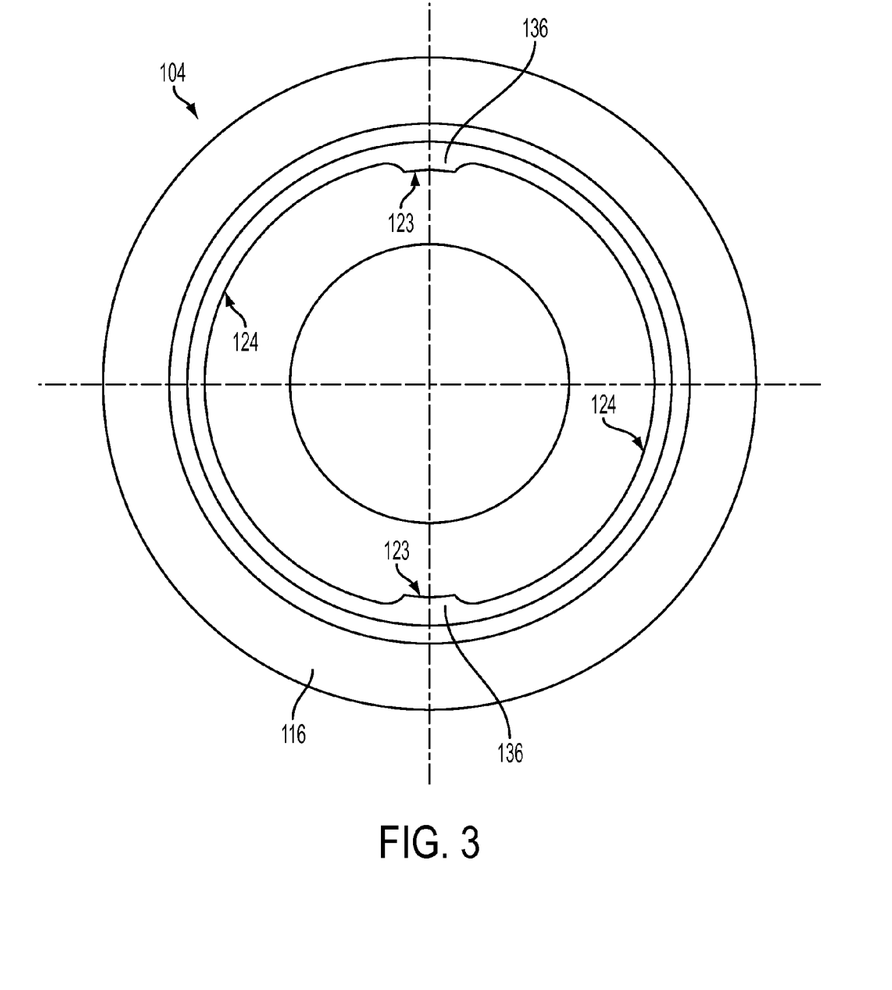
FIG. 3 is a drawing of a portion of an exemplary bearing isolator assembly in accordance with the invention.

In accordance with this embodiment, the outer support member 104 is configured to define a cavity or clearance 134 between the inner member guide surface 121 and the outer support member 104, and between the outer member guide surface 123 (disposed at end of the outer support member 104 that is distal from the outer spring seat 116 along the outer support member axis 114) and the inner support member 102. The cavity 134 is configured to provide clearance to avoid interference between the tabs 130 and the outer support member 104 when the inner support member 102 and the outer support member 104 are disposed in an operational position defined within the path of travel 128. Relative to the cavity 134, the outer member guide surface 124, therefore, defines foot flanges 136 extending outwardly in a radial direction from the outer member guide surface 124. The foot 136 is characterized by a region of the outer support member 104 that defines the outer member guide surface 124. The tabs 130 and the foot 136 are configured so as to define a maximum limit to the range of positions that are operational (i.e., the operational positions) defined within path of travel 128. At an end of the inner member guide surface 122 distal from the inner spring seat 108, the inner support member 102 defines one or more notches 132 between the tabs 130 (see FIG. 1) to selectively facilitate assembly of the inner support member 102 with the outer support member 104 when the feet 136 and the notches 132 are aligned and to impose a maximum limit on the path of travel 128 when the inner support member 102 is assembled into the outer support member 104 and the feet 136 are rotated about the worm axis 126 relative to the notches 132.

It should be appreciated that, in another exemplary embodiment, the inner member guide surface 122 is directed toward the inner support member axis 106, and the inner support member 102 includes one or more, and preferably three, tabs 130 that extend inwardly toward the inner support member axis 106 from the inner member guide surface 122 at an end of the inner member guide surface 122 distal from the inner spring seat 108. In accordance with this embodiment, at an end of the inner member guide surface 122 distal from the inner spring seat 108, the inner support member 102 defines one or more notches 132 formed in the tabs 130 to selectively facilitate assembly of the inner support member 102 into the outer support member 104 when the feet 136 and the notches 132 are aligned and to impose a maximum limit to the range of operational positions defined within on the path of travel 128 when the inner support member 102 is assembled into the outer support member 104 and the tabs 130 are rotated about the worm axis 126 relative to the notches 132.

In accordance with this embodiment, the outer support member 104 is configured to define a cavity 134 between the inner member guide surface 121 and the outer support member 104 and between the outer member guide surface 123 and the inner support member 102. The cavity 134 is configured to provide clearance to avoid interference between the tabs 130 and the outer support member 104 when the inner support member 102 and the outer support member 104 are disposed within the operational range of positions defined within path of travel 128. Relative to the cavity 134, the outer member guide surface 124, therefore, defines a foot 136. The tabs 130 and the foot 136 are configured so as to define a maximum limit to the path of travel 128.

A resilient member 138 is disposed between the inner spring seat 108 and the outer spring seat 116. The resilient member 138 is configured to accommodate compression between the inner support member 102 and the outer support member 104 within a first portion 140 of the path of travel 128. The resilient member 138 may comprise a coil spring or any other structure configured and arranged for resisting compression along the worm axis 126 between the inner support member 102 and the outer support member 104.

In an exemplary embodiment, the resilient member 138 is a metallic coil spring configured so as to provide a force of between approximately two Newtons and approximately 100 Newtons as the resilient member 138 is compressed in connection with the movement of the inner support member 102 relative to the outer support member 104 along a first portion 140 of the path of travel 128 corresponding to a worm axis stroke (i.e., operational range within the path of travel 128) that is between approximately 0 mm to approximately 5 mm.

In another exemplary embodiment, the resilient member 138 is configured so as to provide a force of between approximately 5 Newtons and approximately 100 Newtons as the resilient member 138 is compressed in connection with the movement of the inner support member 102 relative to the outer support member 104 along a first portion 140 of the path of travel 128 corresponding to a worm axis stroke of between approximately 0 mm and approximately 2 mm.

In an exemplary embodiment, the inner support member 102 defines a ring compression surface 144 that is disposed proximate the distal end of the inner member guide surface 122 at a compression ring radius about the inner support member axis 106. The ring compression surface 144 is disposed so as to face along the internal direction 112 of the inner support member 102. The outer support member 104 defines an outer ring seat 148 that is disposed at a radius that is approximately equal to the compression ring radius and that faces along the internal direction 120 of the outer support member 104. In an exemplary embodiment, the outer ring seat 148 extends radially inward from the outer spring seat 116. In an exemplary embodiment, the outer support member 104 also defines an axial ring compression wall 146. The ring compression wall 146 may be disposed substantially in parallel to the outer support member axis 114, adjacent to the outer ring seat 148, and orthogonal to the outer ring seat 148. The outer ring seat 148 and the axial ring compression wall 146 cooperate to define a ring envelope 152.

An elastomeric ring 150 is disposed on the outer ring seat 148 or, in an exemplary embodiment, retained within the ring envelope 152 of the outer support member 104. When the inner support member 102 and the outer support member 104 are engaged with one another, the ring compression surface 144 positioned for contact with, and compression of, the elastomeric ring 150 between the outer ring seat 148 and the ring compression surface 144 as the inner support member 102 moves relative to the outer support member 104 along the worm axis 126 within a second portion 154 of the path of travel 128.

In an exemplary embodiment, the elastomeric ring 150 is a tubular elastomer arranged as a ring and configured so as to provide a force of between approximately 0 Newtons and approximately 2000 Newtons as the elastomeric ring 150 is compressed in connection with the movement of the inner support member 102 relative to the outer support member 104 along the second portion 154 of the path of travel 128 corresponding to a worm axis stroke of from approximately 5 mm to approximately 5.5 mm.

In an exemplary embodiment, the first portion 140 of the path of travel 128 includes the second portion 154 of the path of travel 128 such that the force produced by the elastomeric ring 150 so as to resist compressive movement of the inner support member 102 relative to the outer support member 104 along the worm axis 126 within the second portion 154 of the path of travel 128 is reinforced by the force produced by the resilient member 138 within the second portion 154 of the path of travel 128.

The resilient member 138 is configured and arranged so as to provide a first biasing force characteristic 156 urging the inner support member 102 apart from the outer support member 104. The elastomeric ring 150 is configured and arranged so as to provide a second biasing force characteristic 158 urging the inner support member 102 apart from the outer support member 104. Axial loading of the bearing isolator assembly, as supported by the combination of the first biasing force characteristic 156 and the second biasing force characteristic 158 inhibits relative rotational movement between the inner support member 102 and the outer support member 104.

Figure 4:
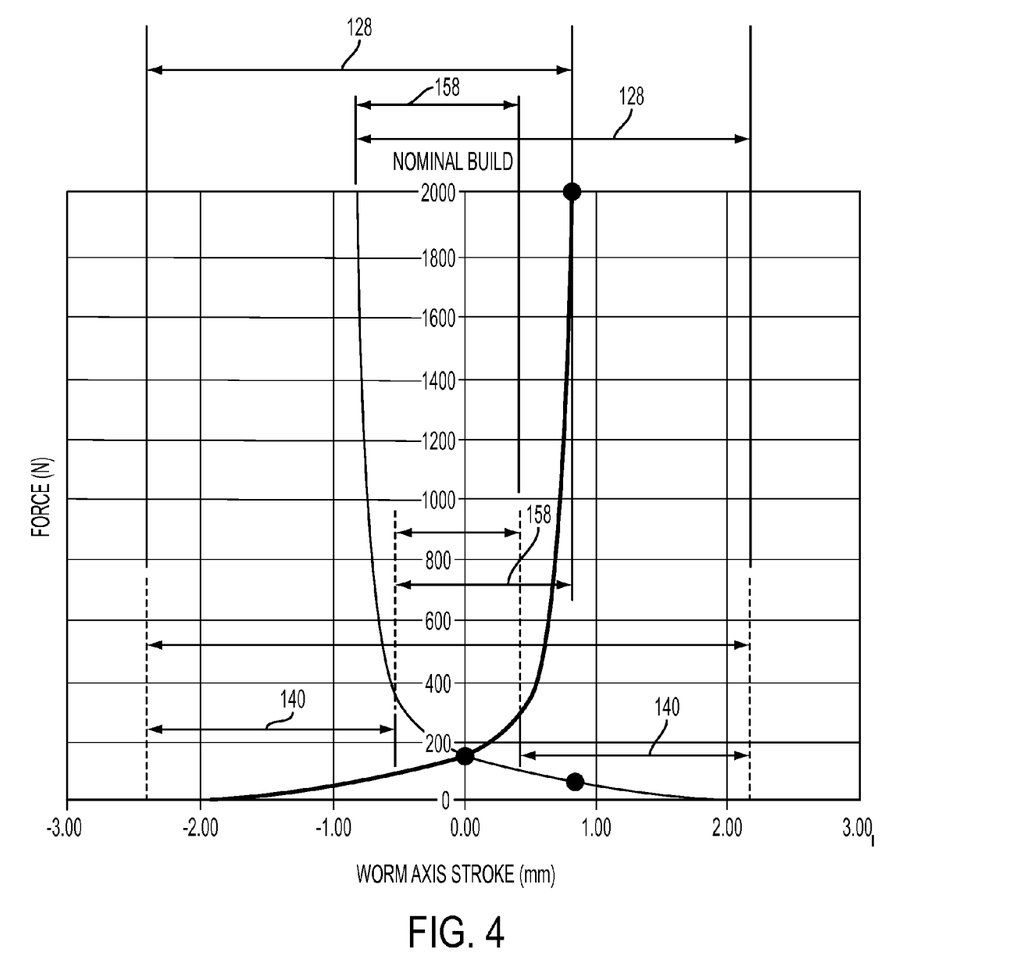
FIG. 4 is a graph of an exemplary relationship between worm axis stroke and isolator force for an exemplary bearing isolator assembly.
Figure 5:
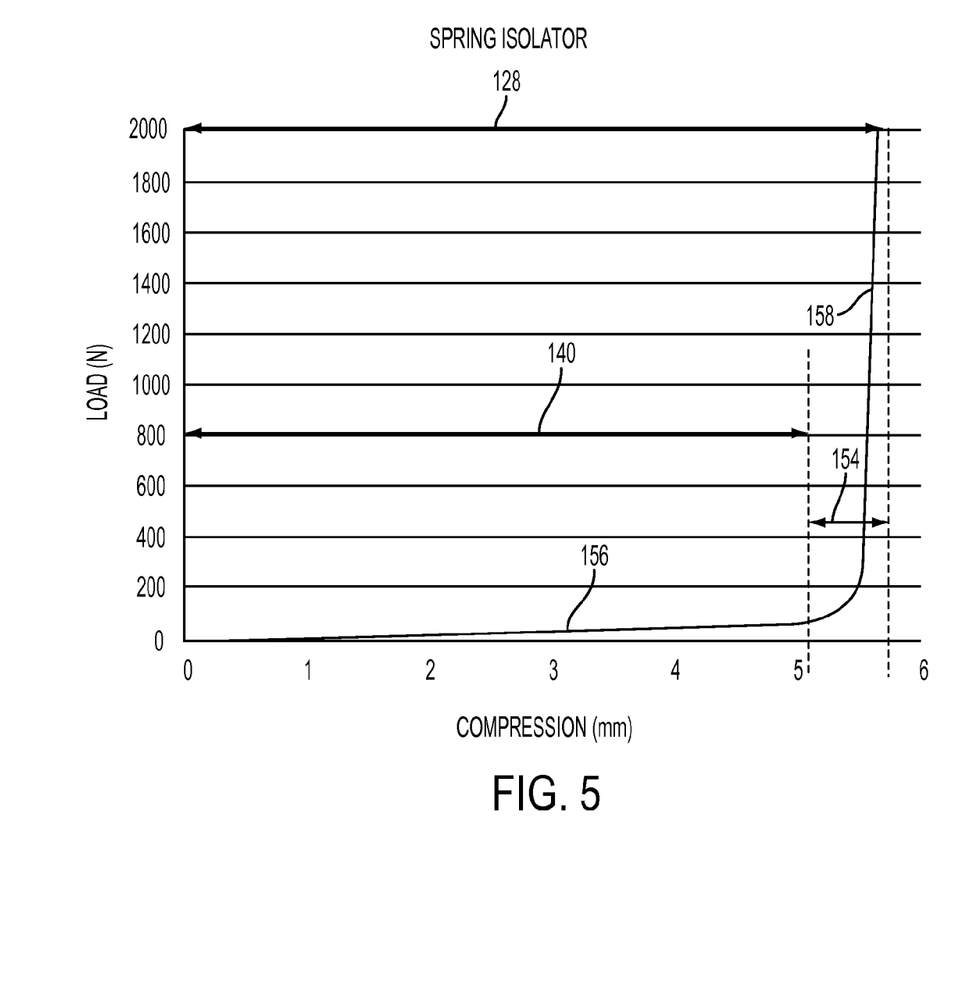
FIG. 5 is a graph of an exemplary relationship between worm axis stroke and isolator force for an exemplary bearing isolator assembly.

Accordingly, in an exemplary embodiment, an improved bearing isolator assembly 100 absorbs manufacturing tolerances of adjacent structures such as bearings while providing increased free height and allowing for greater duration of loading. As a result, conventional disadvantages such as noise and vibration may be effectively mitigated. A bearing isolator assembly 100 also enables pre-loading of associated bearings while being tunable as desired through modifications to either or both of the resilient member 138 and the elastomeric ring 150. For example, the bearing pre-load can be altered by changing the resilient member 138 with one having a greater or lesser spring constant. Worm axis 126 turning torque is also a tunable function of this design. Not only can the force of the resilient member 138 be altered, the material properties and volume and surface characteristics of the elastomer can be changed to satisfy varying conditions. All three stages of the spring force curves shown on FIG. 4 and FIG. 5 can be altered/tuned to accommodate worm travel and rate of deceleration. Thus, a bearing isolator includes a resilient member 138 for providing a first force characteristic within a first range of travel and also includes an elastomeric member providing a second force characteristic within a second range of travel.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A bearing isolator assembly comprising:
   an inner support member;
   an outer support member configured to cooperate with the inner support member so as to define a path of travel of the inner support member relative to the outer support member;
   a resilient member; and
   an elastomeric ring;
   wherein the inner support member defines an inner spring seat directed toward the outer support member, the outer support member defines an outer spring seat directed toward the inner support member, the resilient member is disposed between the inner spring seat and the outer spring seat, and the resilient member is configured to resist compression between the inner support member and the outer support member within a first portion of the path of travel;
   wherein the outer support member defines a ring envelope, the elastomeric ring is disposed in the ring envelope, the inner support member defines a ring compression surface directed toward the elastomeric ring, and the elastomeric ring is configured to resist compression between the ring compression surface of the inner support member and the ring compression surface of the outer support member within a second portion of the path of travel;
   wherein the inner support member includes one or more tabs extending radially outward from an inner member guide surface at an end of the inner member guide surface distal from the inner spring seat, and at least one notch is formed in the one or more tabs;
   wherein the outer support member includes one or more foot flanges extending radially inward from an outer member guide surface at an end of the outer member guide surface distal from the outer spring seat, each foot flange of the one or more foot flanges configured for insertion through one notch of the at least one notch to facilitate assembly of the inner support member with the outer support member; and
   wherein the one or more tabs and the one or more foot flanges are configured to engage each other to facilitate preventing movement of the outer support member and the inner support member away from each other.

2. The bearing isolator assembly of claim 1, wherein the inner member guide surface extends in parallel with a worm axis.

3. The bearing isolator assembly of claim 2, wherein the outer member guide surface is configured for cooperating with the inner member guide surface of the inner support member so as to define a path of travel of the outer support member relative to the inner support member along the worm axis.

4. The bearing isolator assembly of claim 1, wherein the first portion of the path of travel comprises the second portion of the path of travel.

5. The bearing isolator assembly of claim 1, wherein the resilient member is configured and arranged so as to provide a first biasing force characteristic urging the inner support member apart from the outer support member.

6. The bearing isolator assembly of claim 1, wherein the elastomeric ring is configured and arranged so as to provide a second biasing force characteristic urging the inner support member apart from the outer support member.

7. The bearing isolator assembly of claim 1, wherein the elastomeric ring is configured and arranged so as to provide an axial load characteristic that is configured and applied so as to resist rotation of the inner support member relative to the outer support member about the worm axis when the ring compression surface is in contact with the elastomeric ring.

8. The bearing isolator assembly of claim 1, wherein the inner support member is disposed substantially symmetrically about the worm axis.

9. The bearing isolator assembly of claim 1, wherein the outer support member is disposed substantially symmetrically about the worm axis.

10. The bearing isolator assembly of claim 1, wherein the inner member guide surface is directed away from an inner support member axis, and the outer member guide surface is directed toward an outer support member axis.

11. The bearing isolator assembly of claim 10, wherein the inner member guide surface is disposed at a radius equal to or slightly less than that of the outer member guide surface.

12. A bearing isolator assembly comprising:
an inner support member concentric about a central axis, the inner support member defining an inner spring seat and a first annular flange extending from the inner spring seat parallel to the central axis, wherein an outer diameter of the first annular flange defines an inner member guide surface;
an outer support member concentric about the central axis, the outer support member defining an outer spring seat directed toward the inner spring seat, and a second annular flange extending from the outer spring seat toward the inner spring seat, wherein the second annular flange is oriented radially outward of the first annular flange, wherein an inner diameter of the second annular flange defines an outer member guide surface;
a resilient member seated between and in contact with the outer spring seat and the inner spring seat, wherein the resilient member is oriented radially outward of the second annular flange;
an elastomeric ring seated within the outer support member radially inward of the second annular flange, wherein the elastomeric ring is configured to engage a ring compression surface defined on an end surface of the first annular flange distal from the inner spring seat;
wherein the inner support member includes one or more tabs extending radially outward from the inner member guide surface at an end of the inner member guide surface distal from the inner spring seat, and at least one notch is formed in the one or more tabs;
wherein the outer support member includes one or more foot flanges extending radially inward from the outer member guide surface at an end of the outer member guide surface distal from the outer spring seat, each foot flange of the one or more foot flanges configured for insertion through one notch of the at least one notch to facilitate assembly of the inner support member with the outer support member; and
wherein the one or more tabs and the one or more foot flanges are configured to engage each other to facilitate preventing movement of the outer support member and the inner support member away from each other.

13. A bearing isolator assembly comprising:
an inner support member;
an outer support member configured to cooperate with the inner support member so as to define a path of travel of the inner support member relative to the outer support member;
a resilient member; and
an elastomeric ring;
wherein the inner support member defines an inner spring seat directed toward the outer support member, the outer support member defines an outer spring seat directed toward the inner support member, the resilient member is disposed between the inner spring seat and the outer spring seat, and the resilient member is configured to resist compression between the inner support member and the outer support member within a first portion of the path of travel;
wherein the outer support member defines a ring envelope, the elastomeric ring is disposed in the ring envelope, the inner support member defines a ring compression surface directed toward the elastomeric ring, and the elastomeric ring is configured to resist compression between the ring compression surface of the inner support member and the ring compression surface of the outer support member within a second portion of the path of travel;
wherein the inner support member includes one or more tabs extending radially inward from an inner member guide surface at an end of the inner member guide surface distal from the inner spring seat, and at least one notch is formed in the one or more tabs;
wherein the outer support member includes one or more foot flanges extending radially outward from an outer member guide surface at an end of the outer member guide surface distal from the outer spring seat, each foot flange of the one or more foot flanges configured for insertion through one notch of the at least one notch to facilitate assembly of the inner support member with the outer support member; and
wherein the one or more tabs and the one or more foot flanges are configured to engage each other to facilitate preventing movement of the outer support member and the inner support member away from each other.

14. The bearing isolator assembly of claim 13, wherein an inner member guide surface is directed toward an inner support member axis, and an outer member guide surface is directed away from an outer support member axis.

15. The bearing isolator assembly of claim 14, wherein the inner member guide surface is disposed at a radius equal to or slightly greater than that of the outer member guide surface.

16. The bearing isolator assembly of claim 1, wherein the inner member guide surface and the outer member guide surface extend in parallel with the worm axis.

17. The bearing isolator assembly of claim 1, wherein a cross-sectional shape of the inner member guide surface is circular such that the inner support member may rotate about the worm axis relative to the outer support member while the inner member guide surface remains substantially engaged with the outer member guide surface.

18. The bearing isolator assembly of claim 1, wherein the outer support member defines an axial ring compression wall disposed substantially in parallel to an outer support member axis, adjacent to the outer ring seat, and orthogonal to the outer ring seat.

* * * * *